United States Patent [19]
Richardson

[11] 3,727,952
[45] Apr. 17, 1973

[54] TUBE CONNECTOR
[75] Inventor: William D. Richardson, Palos Heights, Ill.
[73] Assignee: Tuthill Pump Company, Chicago, Ill.
[22] Filed: Mar. 2, 1972
[21] Appl. No.: 231,332

Related U.S. Application Data
[63] Continuation-in-part of Ser. No. 54,288, July 13, 1970, abandoned.

[30] Foreign Application Priority Data

| Apr. 19, 1971 | Canada | 110704 |
| June 22, 1971 | France | 7122731 |
| July 12, 1971 | Germany | P 21 34 732.0 |
| May 6, 1971 | Great Britain | 13,531/71 |
| May 15, 1971 | Italy | 50367 A/71 |
| May 26, 1971 | Japan | 46/35610 |

[52] U.S. Cl. ............... 285/101, 285/316, 285/322, 251/149.1
[51] Int. Cl. ............................................ F16l 17/00
[58] Field of Search ............... 285/316, 322, 101, 285/100, 277, 39

[56] References Cited

UNITED STATES PATENTS

| 2,518,542 | 8/1950 | Hansen | 285/277 |
| 3,525,541 | 8/1970 | Snyder | 285/316 X |
| 2,070,013 | 2/1937 | Krannak | 285/316 |
| 2,138,940 | 12/1938 | Robinson | 285/277 X |
| 2,631,872 | 3/1953 | Wurmser | 285/316 X |
| 3,052,488 | 9/1962 | Bruning | 285/277 X |
| 3,222,088 | 12/1965 | Haeber | 285/316 X |
| 3,291,442 | 12/1966 | Cranage | 285/101 X |
| 3,390,898 | 7/1968 | Sumida | 285/316 X |

FOREIGN PATENTS OR APPLICATIONS

| 127,195 | 6/1944 | Australia | 285/101 |

Primary Examiner—Thomas F. Callaghan
Attorney—Robert C. Brown, Jr. et al.

[57] ABSTRACT

An easily, manipulatable tube connector for connecting apparatus to test equipment and the like, wherein, in an exemplary embodiment, the connector utilizes a pair of jaw-like, gripper members for attachment to the equipment to be tested and the connector is easily positioned to the secured and sealing position by a simple axial movement and is easily and quickly removed thereafter.

17 Claims, 8 Drawing Figures

INVENTOR
WILLIAM D. RICHARDSON

INVENTOR
WILLIAM D. RICHARDSON

BY
Mann, Brown, McWilliams & Bradway
ATTORNEYS

TUBE CONNECTOR

BACKGROUND OF THE INVENTION

This application is a continuation-in-part of my copending application, Ser. No. 54,288, filed July 13, 1970 and now abandoned.

This invention pertains to a tube connector for connecting equipment utilizing thin-wall conduit, tubes or other types of components, such as found in refrigeration apparatus which must be subjected to high pressure test before it can be put into service. In pretesting of such equipment, on an assembly line basis or on a basis where the equipment is already installed, it is necessary to be able to connect the equipment to the testing apparatus and this must be done quickly and easily. The herein disclosed invention pertains to an easily manipulatable tube connector which, in a specific exemplary embodiment, is adapted to grip a threaded conduit or tube fitting of the equipment to be tested and through the connector is coupled into high pressure testing equipment. By the utilization of a pair of jaw-like, collet members, attachment to the threaded tube fitting is easily made and the open end of the fitting is put into sealing engagement with an interior component of the connector and the connector, in turn, is connected to a source of fluid under pressure by which means the equipment to be tested may be subjected to the necessary testing procedures. In a still more exemplary, specific embodiment an internal component of the connector comprises a plunger element which upon engagement to the equipment fitting opens a valve in the tube or valve fitting of the equipment to be tested by means of a simple, shiftable member. For example, in refrigeration apparatus provided with a Schrader valve (a simple pin valve), it is necessary to depress or axially displace the stopper pin of the valve so as to allow access into the tube fitting (and hence the equipment) in which the valve is positioned.

The connector is so configured and fabricated that by simply exerting an axial forward movement to the external surface of the connector, the gripper members are put into the open position and by releasing, spring biasing causes the grippers to move into the closed position to securely grasp the external tube or conduit fitting of the equipment which is to be tested. This same movement performs an effective sealing arrangement to obtain substantially fluid-tight relationship between the tube connector and the fitting of the equipment to be tested.

Conduit communication within the tube connector communicates the interior of the fitting which has been grasped and sealed to test equipment by which means high pressure fluid may be introduced into the equipment to be tested. In order to release the tube connector, the reverse aforedescribed process is repeated.

The prior art, as far as shown, has resorted to primarily lever and elastomer sealing units and the like for connecting a tube or fitting to test equipment. In most of these cases, however, no means have been provided to act as a pair of opposed grippers or jaw-like members in order to provide secure attachment to the tube, which is to be connected to the fluid under high pressure. Additionally, these prior art devices have not provided the quick connect and disconnect attributes that are obtained through the present invention.

SUMMARY OF THE INVENTION

In an exemplary embodiment, the invention pertains to a tube connector comprising a first member carrying gripper means to grip the end of a tube. A second member is secured to the first member and carries a tube sealing means to seal the end of a tube inserted thereinto. The gripper means are axially shiftable with respect to the second member and is adapted to be positioned into a gripping position and a nongripping position with respect to a tube inserted thereinto. The first and second members are in internal communication with one another and the second member is provided with means which is adapted to be connected to a testing apparatus or a source of fluid under pressure.

DESCRIPTION OF THE PREFERRED EMBODIMENTS

Figure 1:
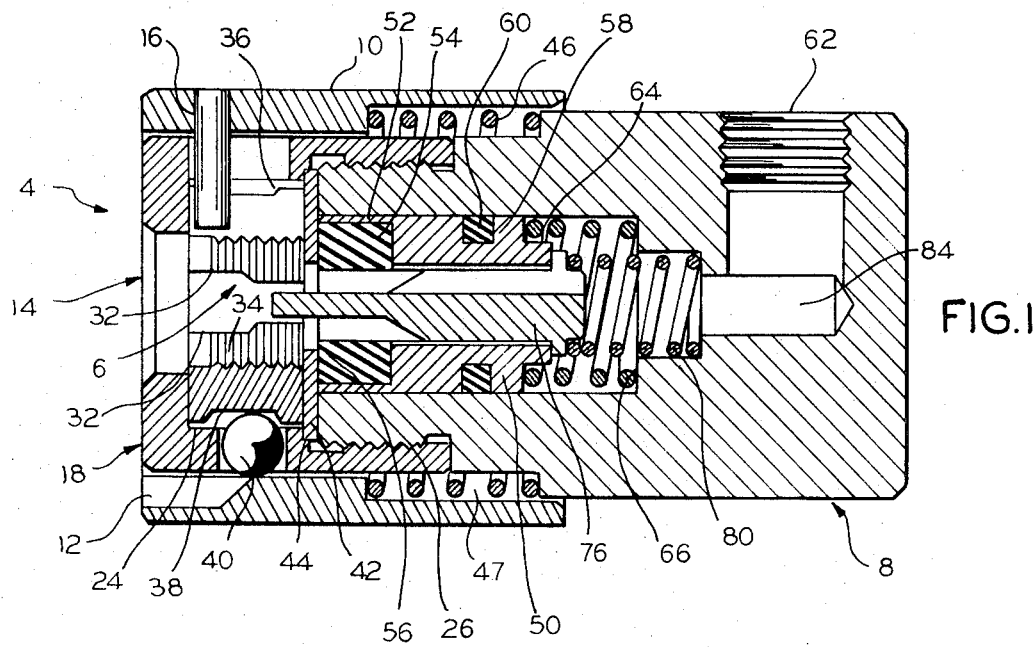
FIG. 1 is an elevational view partially in cross-section taken along the lines 1—1 of FIG. 2 of one of the tube connectors of this invention.

Throughout the several views, liek numerals of reference will refer to like elements throughout, and referring specifically to the figures, the tube connector, generally designated at 2, comprises two major components, a first member generally designated 4 and carrying the gripper means generally designated 6 and a second major component or member generally designated 8 which is threadably secured to a head member 18 included in the first gripper carrying member 4. The sleeve 10 is annular in shape and is generally tubular having a forward interior surface that is of less thickness at two portions than the remainder as by means of slots such as 12, the reasons for which will become apparent. The exterior surface of sleeve 10 may be knurled or the like for easy manipulation and grasping by the thumb and forefinger of the human hand, for instance. Positioned inwardly from the tube inlet end 14 of the tube connector 2, the sleeve 10 is provided with two apertures such as 16 for securing head member 18 within bore 20 of sleeve 10. It will be noted that the terminal portion of the sleeve 10 opposite the inlet 14 has a greater bore than is required to receive the head 18 and provides a spring recess as will become apparent while the sleeve 10 adjacent the inlet 14 has a diameter sufficient to receive the head 18 in axially shiftable relationship. The head 18 is also annular in shape and is provided with a plurality of bores, the first of which is adapted to accommodate the outside diameter of a tube fitting which is inserted into the tube inlet 14. The second bore 24 is fashioned to receive and accommodate the gripper means 6 which will be hereinafter disclosed in more detail and the third bore 26 is provided with internal threads so that member 8 may be threadably secured thereinto. Head 18 is provided with two oppositely disposed elongated slots such as 28 which are of sufficient size to receive guide pins such as 30. The pins 30 also are received in the apertures 16. Positioned within bore 24 of sleeve 18 in free-bearing relationship are gripper means 6 here taking the form of a pair of collets 32 being semicircular in shape and having a threaded interior portion as at 34 and having an exterior surface provided with ridges such as 36 to thereby define a track such as 38 therebetween within which roller or sliding means such as ball bearings 40 will be retained. In assembly, of course, ball bearings 40 will ride between the ridges of collet members 32 and more specifically within the track or raceway 38 defined therebetween and against the interior surface of the sleeve 10 and in particular within the interior of slots 12 provided therein. Thus, in the closed or gripping position of the tube connector, the gripping means or collets 32 are separated from one another by oppositely disposed pins 30 located 180° apart, each of pins 30 extending inwardly a sufficient distance to maintain the collets in the separated relationship. In the gripping position of the connector, as shown in FIG. 1, the balls 40 ride out of the slots 12 to thereby bear against the collets 32 at the area of the raceway 38. This, of course, performs the gripping or closing action of the tube connector 2. In contradistinction, when the sleeve 10 is moved backwards or away from the inlet designated 14, the balls 40 will drop into the slots 12 to thereby allow collets 32 to assume the open or nongripping position and the axial limit of movement of sleeve 10 of connector 2 is determined by the length of the elongated slots 28 provided in head 18.

Positioned adjacent collets 32 is annular guide ring 42 which is retained within head member 18 by the recess 44 provided therefor and retained thereagainst due to the threaded conneciton of the second member or cylinder 8. The spring member 46 positioned within the spring recess 47 formed between the sleeve 10 and cylinder 8 biases or forces sleeve 10 and thus connector 2 into the gripping or closed condition as shown in FIG. 1. The cylinder, or second member 8, in this particular instance actually performs the fluidtight sealing engagement between tube connector 2 and the tube fitting of the equipment to be tested as will become apparent. Second member or cylinder 8 carries a plunger member 50 in the form of a cylinder having a plurality of various diameter bores, the first of which 52 is adapted to receive a sealing element such as seal 54 made of an elastomer or similar type material (neoprene being preferred) which nestles within bore 52 provided in plunger element 50. It will be noted that it is the end of the tube fitting of the equipment to be tested which comes into contact with the exterior surface 56 of sealing member 54. In order to insure fluid-tight engagement and prevent fluid loss between the threaded connection of cylinder 8 and head 18, O-ring groove 58 and O-ring or other type sealing member 60 is positioned therein. Suitable fluid communication through sealing element 54 and plunger element 50 is provided so that access may be had to the test equipment connection such as 62 of cylinder or member 8. So that the plunger 50 will be forwardly positioned when connector 2 is put in the connecting or securing position, a recess or shoulder such as 64 is provided on the rearward portion of plunger 50 to receive spring means such as 66 which bears against an interior shoulder such as 68 provided in member 8. This feature then insures that the sealing surface 56 of sealing element 54 is always in abutting contact with the end of the fitting of the equipment to be tested. In a specific instance, however, and referring to FIG. 3, where the equipment 70 to be tested is provided with a threaded extension such as 72 carrying therein a Schrader valve such as 74 it becomes necessary to utilize a Schrader valve opening member or pintle 76 adapted to be carried in the main bore of plunger 50 and have the extreme pointed end 78 present itself to the interior of the connector means 72 to operate upon the pin element (not shown) of Schrader valve 74. To this end the valve opening member 76 bears against spring member 80 which is positioned within the recess 82 of member 8 provided for that purpose. The interior bore 84 of member 8 continues on to communicate with threaded opening 62 by which means a charging fluid may be introduced into the equipment 70 to be tested.

In operation, and to recap simply the obvious operation of the tube connector, one merely retracts the sleeve 10 which opens the pair of collets 32 which allows for the placement of connector 2 over the fitting 72 of the equipment 70 to be tested. Positioning of the connector 2 in proper registration takes place when the extremity of the connector means 72 abuts guide ring 42 which then places surface 56 of sealing member 54 around the external periphery of the aperture or orifice of connector fitting 72. During this time the pin element of the Schrader valve 74 is forced into the open position by means of pin 76, and more specifically pointed end 78. The actuating sleeve 10 is then released and the collets 32 are driven into the closed or gripping position by means of the balls 40 as earlier discussed. The threaded interior surface of the collets 32 firmly grasp the threaded exterior of the connector fitting 72. Tube connector 2 is now ready to be connected by orifice 62 to a fluid under pressure or to other testing equipment. When a charging fluid is introduced, the plunger element 50 and the seal formed by sealing member 54 increases the fluid-tight connection between connector 2 and the source of fluid under pressure. After the testing procedure, the actuating sleeve 10 is moved to the open or nongripping position to remove the connector 2 from the equipment undergoing test.

Figure 4:
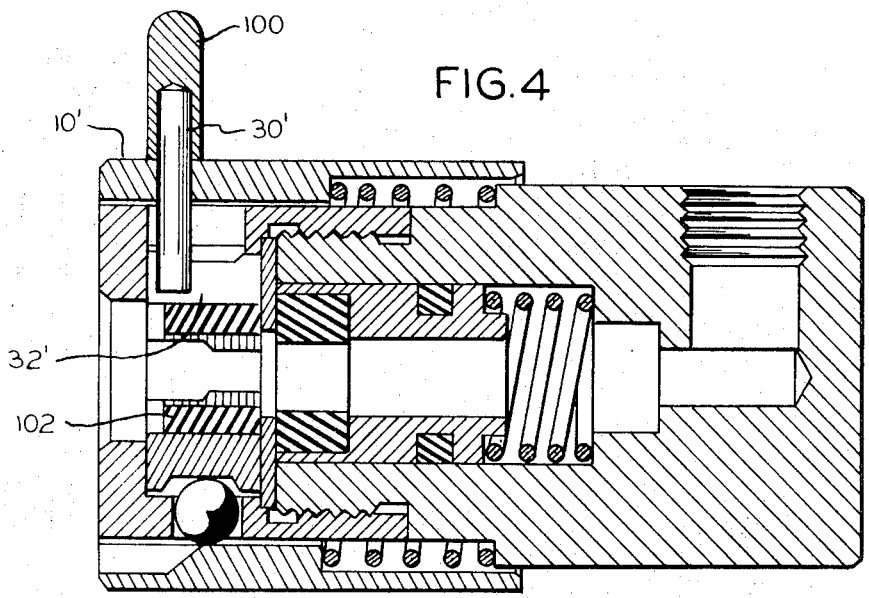
FIG. 4 is a cross-sectional side view of another embodiment of the tube connector of this invention.
Figure 6:
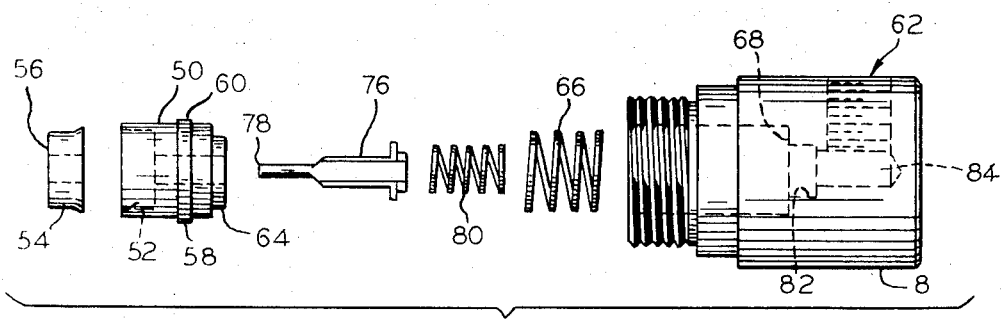
FIG. 6 is an exploded view of a component of the connector depicted in FIG. 5.
Figure 5:
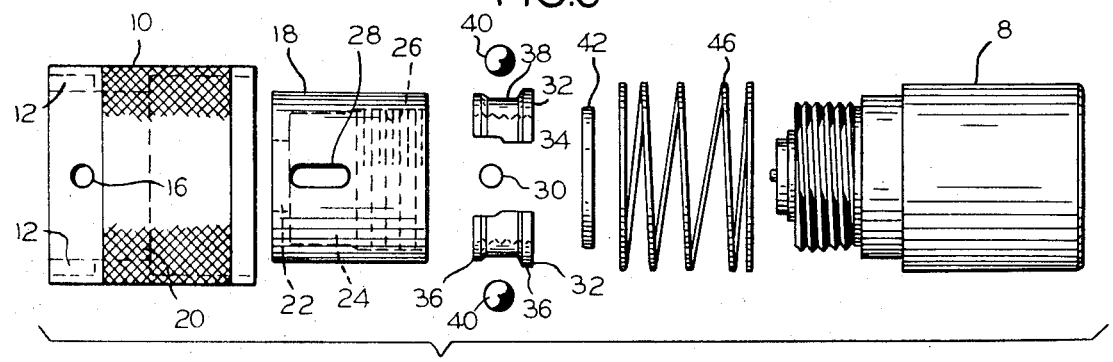
FIG. 5 is an exploded view of the connector depicted in FIGS. 1 and 2.

Another embodiment of the tube connector of this invention is illustrated in FIG. 4. Essentially, all of the major components are the same as for the tube connector already described and the operation is identical and thus only the differences or modifications that are made in the FIG. 4 embodiment will be delved into. For instance, in order to facilitate positioning of the outer sleeve member such as 10', one of the guide pins 30' is extended to project above the exterior surface of sleeve member 10'. Attached to the uppermost extending portion of the pin 30' is a thumb pad member such as 100 by which manipulation of the connector by means of grasping the thumb pad 100 to axially move sleeve member 10' is accomplished. Additionally, since the particular type of equipment to be tested does not utilize a Schrader-type valve in the connector end, the pin such as 76 may be eliminated along with spring 80 which acts therewith in the FIG. 1 embodiment of tube connector 2. Since a Schrader-type valve connector is not contemplated, i.e., one that does not have a threaded external surface, the collets 32' may be provided with an internal elastomeric type bushing insert such as 102 which, due to the high coefficient of friction will provide suitable anchoring to a smooth tipped connector or fitting element. Additionally, inserts 102 may be molded directly onto the interior surface of the collet member 32'. As indicated earlier, operation and use of this connector is the same as that already described.

Figure 2:
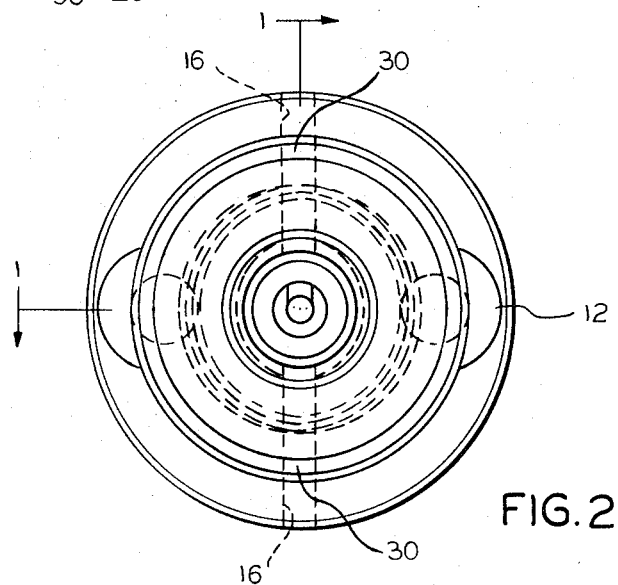
FIG. 2 is a front view of the tube connector depicted in FIG. 1.
Figure 7:
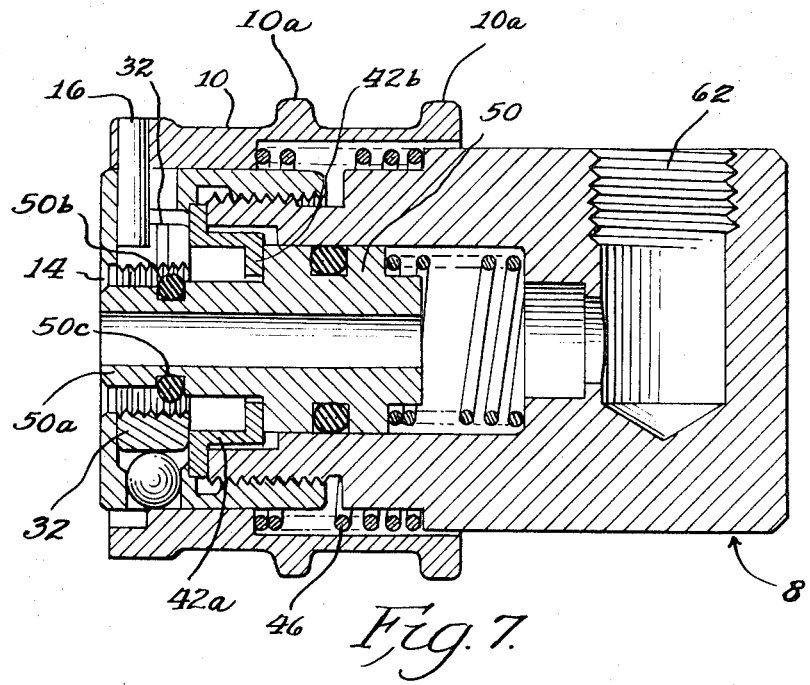
FIG. 7 is a sectional view showing a connector similar to that illustrated in FIGS. 1 and 4 while showing a plunger formed to be received internally of a tube being tested.
Figure 8:
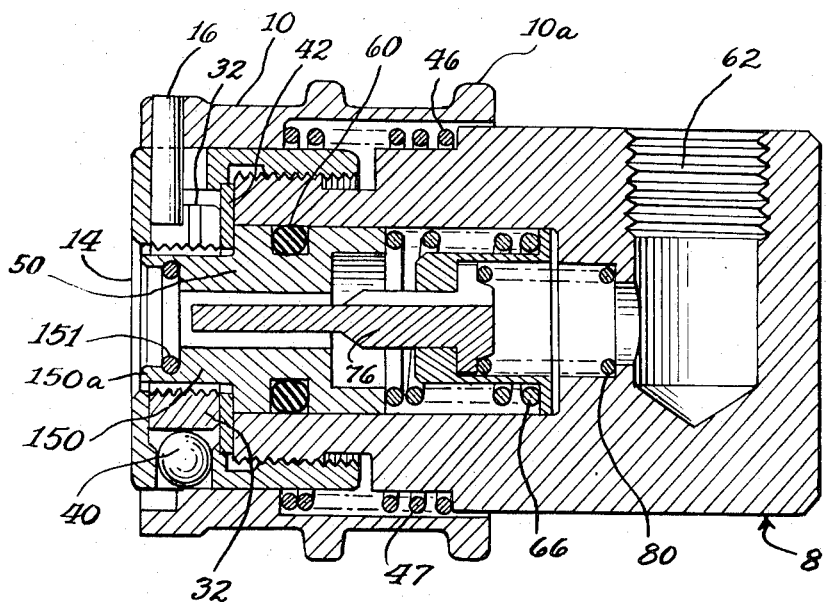
FIG. 8 is a sectional view, and similar to FIGS. 1 and 4, while showing a modification in the manner of effecting a seal with a valve or tube being tested with the basic apparatus of FIG. 1.

FIGS. 7 and 8 illustrate further modifications. In FIGS. 7 and 8 the sleeve 10, head 18, collets 32, and plunger 50 are assembled together in the same structural and functional relationship described with respect to FIGS. 2 and 4. In FIGS. 7 and 8 the slidable sleeve 10 is shown as provided with ribs 10a for gripping purposes.

In FIG. 7 plunger 50 is especially formed so as to receive a tube to be tested thereover. For this purpose, plunger 50 includes a reduced cylindrical portion 50a which projects through and beyond stop and guide ring 42a so that, in the expanded position of the plunger 50 and the expanded position of sleeve 10 relative to head member 18, the end of this projection is within opening 14 of the head. In this position, the reduced portion 50a extends inwardly beyond the collets 32. Guide and stop ring 42a has a cuplike configuration so that its inner side 42b bears against a shoulder 50d between the reduced portion and the remainder of the plunger. The outer side is held between sections 18 and 8 as is guide ring 42 in FIG. 1. An O-ring 50b is seated in an annular groove 50c in the reduced portion so that a tube to be tested may be fitted over the reduced portion 50a with the end of the tube overlying and sealed to the seal ring 50b. The tube being tested may then partially overlie the reduced portion between O-ring 50b and the inner side of guide ring 42a.

During placement of the tube to be tested, the sleeve 10 is retracted against spring 46 to allow expansion of the collets 32. As the tube being tested moves over the O-ring 50b, it may force plunger 50 to the right in FIG. 7 so that the tube is entirely within the collet members. When sleeve 10 is released to allow relative expansion of the sleeve and head member, the collets will then close firmly against the tube to hold it in a sealed relation to plunger 50.

In FIG. 8 plunger 50 includes a reduced portion 150 extending through and beyond ring 42 and within the space between the collets 38.

Reduced portion 150 has a counterbore 150a axially aligned with actuating pin 76. An O-ring 151 is seated in a groove in the internal wall of the counterbore 150a. Seal ring 151 is adapted to seal against the exterior wall of a valve or tube being tested. In the expanded position of the parts, as illustrated in FIG. 8, all of the counterbore 150a and O-ring are positioned outwardly beyond the end of pin 76.

Figure 3:
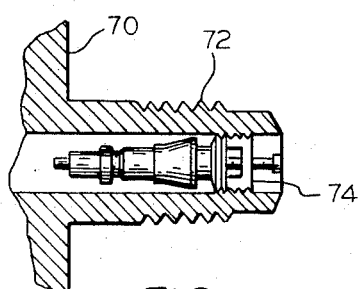
FIG. 3 is a fragmented view, partially in cross-section of a tube fitting with which the connector of FIGS. 1 and 2 is to be used.

The apparatus of FIG. 8 operates in the same fashion as the apparatus described with respect to FIG. 1 except that in FIG. 8 the seal ring 151 will contact the exterior wall of the valve of the type illustrated in FIG. 3 being tested prior to the time that pin 76 contacts the actuating element in the valve being tested. This sealing engagement is made before the collets can close on the valve and before the valve is opened. As the valve is moved inwardly, it forces plunger 50 to the right in FIG. 8, thus permitting the pin 76 to open the valve. When sleeve 10 is released, the collets 32 lock the valve in place.

By providing the reduced projecting portion 150, the valve being tested will be closed prior to the time that the valve is removed from a sealing engagement with seal ring 151. This is because of the location of the seal ring 151 outwardly of the actuating end of pin 76.

Thus, a tube connector which is easily manipulated and which provides quick connecting of equipment to be tested with a testing apparatus has been described and illustrated.

I claim:

1. A tube connector comprising a first head member carrying a pair of collet members to grip an end of a tube, a second member secured to said head member and carrying a tube sealing means to seal the end of a tube inserted thereinto, said collet members being readily expansible and contractable and being adapted to be positioned into a gripping position and a non-gripping position with respect to a tube inserted thereinto, said first and second members being in internal communication with one another and being provided with means adapted to be connected to a fluid under pressure, means normally biasing said collet members into a contracted gripping position, an outer sleeve member positioned around said head member and carrying oppositely disposed guide pins, said guide pins extending radially inwardly from said sleeve member into elongated slots in said head member, said guide pins extending into spaces between said collet members to keep said collet members in a separated relationship, a portion of the internal surface of said outer sleeve member being of lesser thickness than the remainder thereof providing a raceway, said collet members having a track configuration to retain ball members therebetween and said head member, said head member having apertures to retain said ball members and allow coaction of said ball members and collet members when said sleeve is moved axially relative to said head member to thereby produce movement of said collet members to said positions.

2. A tube connector in accordance with claim 1 wherein at least one of said guide pins extend outward from the exterior surface of said sleeve for easy manipulation thereof.

3. A tube connector in accordance with claim 1 wherein said second member is threadably secured to said head member and said head member and said second member cooperate to keep said pair of collet members in retained relationship.

4. The tube connector in accordance with claim 3 wherein a stop member is positioned adjacent the said collet members and said second member and the interior surface of said sleeve and the exterior surface of said second members cooperate to form a spring recess therebetween and spring means retained therein normally biases said sleeve member to an outward position to thereby move said collet members into the gripping position.

5. The tube connector in accordance with claim 4 wherein said second member includes a first bore carrying said tube sealing means comprising a plunger member retained within said bore in shiftable relationship and communicating to said means adapted to be connected to a fluid under pressure.

6. The tube connector in accordance with claim 5 wherein an elastomeric seal member is carried at the extremity of said plunger and is adapted to contact said open end of said tube to be sealed.

7. The tube connector in accordance with claim 6 wherein said plunger member is spring biased toward the inlet of said bore adjacent said collet members.

8. The tube connector in accordance with claim 7 wherein said plunger member carries a valve opening pin in spring biased relationship therewith.

9. The tube connector in accordance with claim 6 wherein the interior surface of said pair of collet members are threaded to grasp the end of a threaded tube which is to be tested.

10. The tube connector in accordance with claim 7 wherein the interior surface of said collet members are provided with an elastomer sealing surface.

11. A tube connector comprising a sleeve and a head member positioned within said sleeve, said sleeve and head member being axially movable relative to one another, said head member having an opening in one end thereof to receive a tube, said head member having tube sealing means therein and means providing communication through said sealing means to a tube inserted within said head member, said head member having a plurality of arcuately formed collet members carried therein and positioned between said sealing means and said one end of said member to receive said tube, said sleeve having guide pins fixed thereto and extending radially through longitudinally extending slots in the exterior wall of said head member, said pins and slots providing a relative movement limit for said head member and sleeve, said pins extending into spaces between said collet members so as to maintain said collet members in a separated relation while allowing radial contraction and expansion and gripping and ungripping action of said collet members, and ball means coacting with said sleeve, head member and collet member to cause contraction and expansion of said collet members upon relative movement of said sleeve and head member.

12. The structure of claim 11 wherein said ball means includes balls positioned within apertures formed in the exterior surface of said head member, said balls being exposed to said sleeve and said collet members for contact therewith, said collet members including tracks on the outer surfaces thereof to receive said balls, said sleeve being formed with spaced depressions positioned to receive portions of said balls when said sleeve is moved axially relative to said head member in one direction, said balls being forced by said sleeve against said collet members to cause a gripping, contracting action of said collet members when said sleeve is moved in the opposite direction.

13. The structure of claim 12 characterized by and including resilient means biasing said sleeve and head member in said last named direction.

14. A tube connector in accordance with claim 13 wherein said head member includes a first bore carrying said tube sealing means and a plunger member retained within said bore in shiftable relationship and communicating to said means adapted to be connected to a fluid under pressure.

15. The structure of claim 11 wherein said head member has a spring biased plunger therein, said plunger has a reduced portion with a counterbore therein, said sealing means is within said counterbore, said reduced portion having one limit position within said collet members, said plunger and reduced portion being biased toward said position and being retractable therefrom.

16. The structure of claim 15 wherein said sealing means is positioned outwardly of an actuating pin in a bore in said plunger in said one position.

17. The structure of claim 11 wherein said head member has a spring biased plunger axially movable therein and said plunger has an outwardly extending reduced portion, said sealing means being defined by a seal ring on the outer wall of said reduced portion.

* * * * *